United States Patent
Moriyama et al.

(10) Patent No.: US 10,223,405 B2
(45) Date of Patent: Mar. 5, 2019

(54) RETRIEVAL CONTROL METHOD AND RETRIEVAL SERVER

(71) Applicant: FUJITSU LIMITED, Kawasaki-shi, Kanagawa (JP)

(72) Inventors: Yasunobu Moriyama, Yokohama (JP);
Masahiko Nagata, Kawasaki (JP);
Kiichi Yamada, Numazu (JP)

(73) Assignee: FUJITSU LIMITED, Kawasaki-shi (JP)

( * ) Notice: Subject to any disclaimer, the term of this patent is extended or adjusted under 35 U.S.C. 154(b) by 225 days.

(21) Appl. No.: 15/267,276

(22) Filed: Sep. 16, 2016

(65) Prior Publication Data

US 2017/0097954 A1   Apr. 6, 2017

(30) Foreign Application Priority Data

Oct. 1, 2015   (JP) ................. 2015-196176

(51) Int. Cl.
*G06F 17/00*  (2006.01)
*G06F 17/30*  (2006.01)

(52) U.S. Cl.
CPC .. *G06F 17/30371* (2013.01); *G06F 17/30312* (2013.01); *G06F 17/30377* (2013.01)

(58) Field of Classification Search
CPC ............... G06F 17/30; G06F 17/30371; G06F 17/30312
USPC .................................................. 707/600–899
See application file for complete search history.

(56) References Cited

U.S. PATENT DOCUMENTS

| | | | |
|---|---|---|---|
| 2002/0099698 A1 | 7/2002 | Abe et al. | |
| 2010/0010970 A1* | 1/2010 | Takeuchi | G06F 17/30911 707/E17.008 |
| 2012/0197938 A1 | 8/2012 | Yamada | |

FOREIGN PATENT DOCUMENTS

| | | |
|---|---|---|
| JP | 5-61919 | 3/1993 |
| JP | 2002-222194 | 8/2002 |
| JP | 2011-8811 | 1/2011 |
| JP | 2012-159887 | 8/2012 |

* cited by examiner

*Primary Examiner* — Isaac M Woo
(74) *Attorney, Agent, or Firm* — Staas & Halsey LLP

(57) ABSTRACT

A processor determines whether to generate a first entry, based on whether a second entry is in a storage, for each conditional expression included in retrieval expressions. The first entry includes, in association with a first identifier, a first path included in the conditional expression. The second entry includes, a second path identical to the first path in association with a second identifier. The processor determines whether to generate a third entry based on whether a fourth entry is in the storage. The third entry includes a first set and a fifth identifier in association with a third identifier. The first set is included in the conditional expression and includes a first value and a first operator. The fifth identifier is the first identifier or the second identifier. The fourth entry includes a second set identical to the first set and the fifth identifier in association with a fourth identifier.

5 Claims, 13 Drawing Sheets

FIG.5A 40 41

| LOGIC NUMBER | KEYWORD | LOGIC NUMBER (PATH) | COMPARISON OPERATOR |
|---|---|---|---|
| A1 | /root/A/A001 | | |

| LOGICAL EXPRESSION NUMBER | LOGICAL EXPRESSION |
|---|---|

FIG.5B 40 41

| LOGIC NUMBER | KEYWORD | LOGIC NUMBER (PATH) | COMPARISON OPERATOR |
|---|---|---|---|
| A1 | /root/A/A001 | | |
| A2 | 1 | A1 | = |

| LOGICAL EXPRESSION NUMBER | LOGICAL EXPRESSION |
|---|---|

FIG.5C 40 41

| LOGIC NUMBER | KEYWORD | LOGIC NUMBER (PATH) | COMPARISON OPERATOR |
|---|---|---|---|
| A1 | /root/A/A001 | | |
| A2 | 1 | A1 | = |

| LOGICAL EXPRESSION NUMBER | LOGICAL EXPRESSION |
|---|---|
| Z1 | A1. A2 |

FIG.5J

| LOGIC NUMBER | KEYWORD | LOGIC NUMBER (PATH) | COMPARISON OPERATOR | LOGICAL EXPRESSION NUMBER | LOGICAL EXPRESSION |
|---|---|---|---|---|---|
| A1 | /root/A/A001 | | | Z1 | A1. A2 |
| A2 | 1 | A1 | = | Z2 | A3. (A4) |
| A3 | /root/B/B001 | | | Z3 | A5. A6 |
| A4 | "book" | A3 | = | Z4 | Z1. Z2. Z3 |
| A5 | /root/C/C001 | | | | |
| A6 | 1 | A5 | = | | |
| A7 | 3 | A5 | = | | |

40 — left table; 41 — right table

FIG.5K

| LOGIC NUMBER | KEYWORD | LOGIC NUMBER (PATH) | COMPARISON OPERATOR | LOGICAL EXPRESSION NUMBER | LOGICAL EXPRESSION |
|---|---|---|---|---|---|
| A1 | /root/A/A001 | | | Z1 | A1. A2 |
| A2 | 1 | A1 | = | Z2 | A3. (A4) |
| A3 | /root/B/B001 | | | Z3 | A5. A6 |
| A4 | "book" | A3 | = | Z4 | Z1. Z2. Z3 |
| A5 | /root/C/C001 | | | Z5 | A5. A7 |
| A6 | 1 | A5 | = | | |
| A7 | 3 | A5 | = | | |

FIG.5L

| LOGIC NUMBER | KEYWORD | LOGIC NUMBER (PATH) | COMPARISON OPERATOR | LOGICAL EXPRESSION NUMBER | LOGICAL EXPRESSION |
|---|---|---|---|---|---|
| A1 | /root/A/A001 | | | Z1 | A1. A2 |
| A2 | 1 | A1 | = | Z2 | A3. (A4) |
| A3 | /root/B/B001 | | | Z3 | A5. A6 |
| A4 | "book" | A3 | = | Z4 | Z1. Z2. Z3 |
| A5 | /root/C/C001 | | | Z5 | A5. A7 |
| A6 | 1 | A5 | = | Z6 | Z1. Z2. Z5 |
| A7 | 3 | A5 | = | | |

40 — (left table), 41 — (right table)

FIG.6
Related Art

| LOGIC NUMBER | KEYWORD |
|---|---|
| A1 | /root/A/A001 |
| A2 | 1 |
| A3 | /root/B/B001 |
| A4 | "book" |
| A5 | /root/C/C001 |
| A6 | 1 |
| A7 | 1 |
| A8 | "book" |
| A9 | 3 |

| LOGICAL EXPRESSION NUMBER | LOGICAL EXPRESSION |
|---|---|
| Z1 | A1. A2 |
| Z2 | A3. (A4) |
| Z3 | A5. A6 |
| Z4 | Z1. Z2. Z3 |
| Z5 | A1. A7 |
| Z6 | A3. (A8) |
| Z7 | A5. A9 |
| Z8 | Z5. Z6, Z7 |

RETRIEVAL CONTROL METHOD AND RETRIEVAL SERVER

CROSS-REFERENCE TO RELATED APPLICATION

This application is based upon and claims the benefit of priority of the prior Japanese Patent Application No. 2015-196176, filed on Oct. 1, 2015, the entire contents of which are incorporated herein by references.

FIELD

The embodiment discussed herein is related to a retrieval control method and a retrieval server.

BACKGROUND

As an existing retrieval system, a large-scale retrieval system is known with which plural clients are coupled and which accepts input of retrieval requests often including long retrieval expressions consisting of plural conditional expressions and always executes the retrieval expressions in a multiplex manner. Such a system may not perform another process while performing a process corresponding to the retrieval request for data on which data retrieval is to be performed. Accordingly, when a new retrieval request is input from a client while the retrieval system is performing a process for retrieval, a process corresponding to the new retrieval request may be delayed until the currently performed process ends.

Retrieval expressions which are input to the retrieval system from different clients and which are to be processed simultaneously by the retrieval system often include identical conditional expressions. In the existing retrieval system, when identical retrieval requests are input in this way, a meaningless process of repeating identical retrieval processes is performed and thus a retrieval time extends in proportion to the total number of conditional expressions which include redundant conditional expressions, thereby delaying the process. Conditional expressions may be redundant not only when identical conditional expressions are included in different retrieval expressions but also when identical conditional expressions are included in a single retrieval expression.

Expressions (1-1) to (1-3) represent examples of plural retrieval expressions. Here, A, B, C1, C2, C3, D1, D2, D3, E1, E2, and E3 respectively represent conditional expressions.

$$\text{Retrieval Expression\_1}=(A \text{ and } B \text{ and } C1) \text{ OR } (A \text{ and } B \text{ and } C2) \text{ OR } (A \text{ and } B \text{ and } C3) \quad (1\text{-}1)$$

$$\text{Retrieval Expression\_2}=(A \text{ and } B \text{ and } D1) \text{ OR } (A \text{ and } B \text{ and } D2) \text{ OR } (A \text{ and } B \text{ and } D3) \quad (1\text{-}2)$$

$$\text{Retrieval Expression\_3}=(A \text{ and } B \text{ and } E1) \text{ OR } (A \text{ and } B \text{ and } E2) \text{ OR } (A \text{ and } B \text{ and } E3) \quad (1\text{-}3)$$

Identical conditional expressions A and B are present in Expressions (1-1) to (1-3). Not only that, the conditional expressions A and B appear three times in Expression (1-1).

To address the problem of redundant conditional expressions, a ride-sharing retrieval method of collectively processing plural retrieval expressions has been proposed. The ride-sharing retrieval is one instance of a "multiple instruction stream, single data stream (MISD)" architecture for enhancing the performance on multiplex processing of retrieval expressions. In the ride-sharing retrieval, plural retrieval expressions received for a predetermined time are merged to perform the retrievals. Therefore, a data reference time for the plural merged retrieval processes becomes 1, thus the processing efficiency may be enhanced.

A related technique is disclosed in, for example, Japanese Laid-Open Patent Publication No. 2002-222194.

In an existing retrieval system, when a specific record is extracted from similar data sets, extraction conditions thereof are complicatedly described and thus retrieval conditions may be often highly complicated. In the retrieval system using the ride-sharing retrieval method, since the data reference time for plural retrieval processes may become 1 by merging data reference regarding identical conditional expressions included in the plural retrieval expressions received for a predetermined time to perform the retrievals, thereby enhancing the processing efficiency.

However, in the retrieval system using the ride-sharing retrieval method, the total number of conditional expressions, which are elements of the retrieval expressions, is not changed even when the retrieval expressions are merged. Accordingly, an evaluation time of conditional expressions is not changed before and after the merging. That is, for identical conditional expressions, the data reference time may become efficient but the evaluation time of the conditional expressions does not become efficient in some cases.

SUMMARY

According to an aspect of the present invention, provided is a retrieval server including a storage device and a processor coupled to the storage device. The processor is configured to determine whether to generate a first entry, on basis of whether a second entry is already stored in the storage device, for each conditional expression included in a plurality of retrieval expressions. The first entry includes a first path in association with newly assigned first identification information. The first path is included in the conditional expression. The second entry includes a second path in association with second identification information different from the first identification information. The second path is identical to the first path. The processor is configured to generate and store the first entry in the storage device upon determining to generate the first entry. The processor is configured to determine whether to generate a third entry on basis of whether a fourth entry is already stored in the storage device. The third entry includes a first set and fifth identification information in association with newly assigned third identification information. The first set is included in the conditional expression and includes a first value and a first operator. The fifth identification information is the first identification information or the second identification information. The fourth entry includes a second set and the fifth identification information in association with fourth identification information different from the third identification information. The second set is identical to the first set. The processor is configured to generate and store the third entry in the storage device upon determining to generate the third entry. The processor is configured to generate a first logical expression using identification information included in entries stored in the storage device. The first logical expression is used to evaluate the conditional expression.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 5A is a diagram illustrating an example of registration in a keyword variable table and a logic table according to an embodiment;

FIG. 5B is a diagram illustrating an example of registration in a keyword variable table and a logic table according to an embodiment;

FIG. 5C is a diagram illustrating an example of registration in a keyword variable table and a logic table according to an embodiment;

FIG. 5J is a diagram illustrating an example of registration in a keyword variable table and a logic table according to an embodiment;

FIG. 5K is a diagram illustrating an example of registration in a keyword variable table and a logic table according to an embodiment;

FIG. 5L is a diagram illustrating an example of registration in a keyword variable table and a logic table according to an embodiment;

FIG. 6 is a diagram illustrating an example of registration in a keyword variable table and a logic table according to a related art;

DESCRIPTION OF EMBODIMENT

Hereinafter, an embodiment of a retrieval control method and a retrieval server will be described in detail with reference to the accompanying drawings.

A retrieval server 20 according to the embodiment will be described below. The retrieval server 20 is a device that outputs retrieval results, respectively, in response to plural retrieval requests. The retrieval server 20 is a computer such as a personal computer or a server computer. The retrieval server 20 enhances a processing efficiency by performing the retrieval after merging identical conditional expressions included in the plural retrieval requests.

Figure 1:
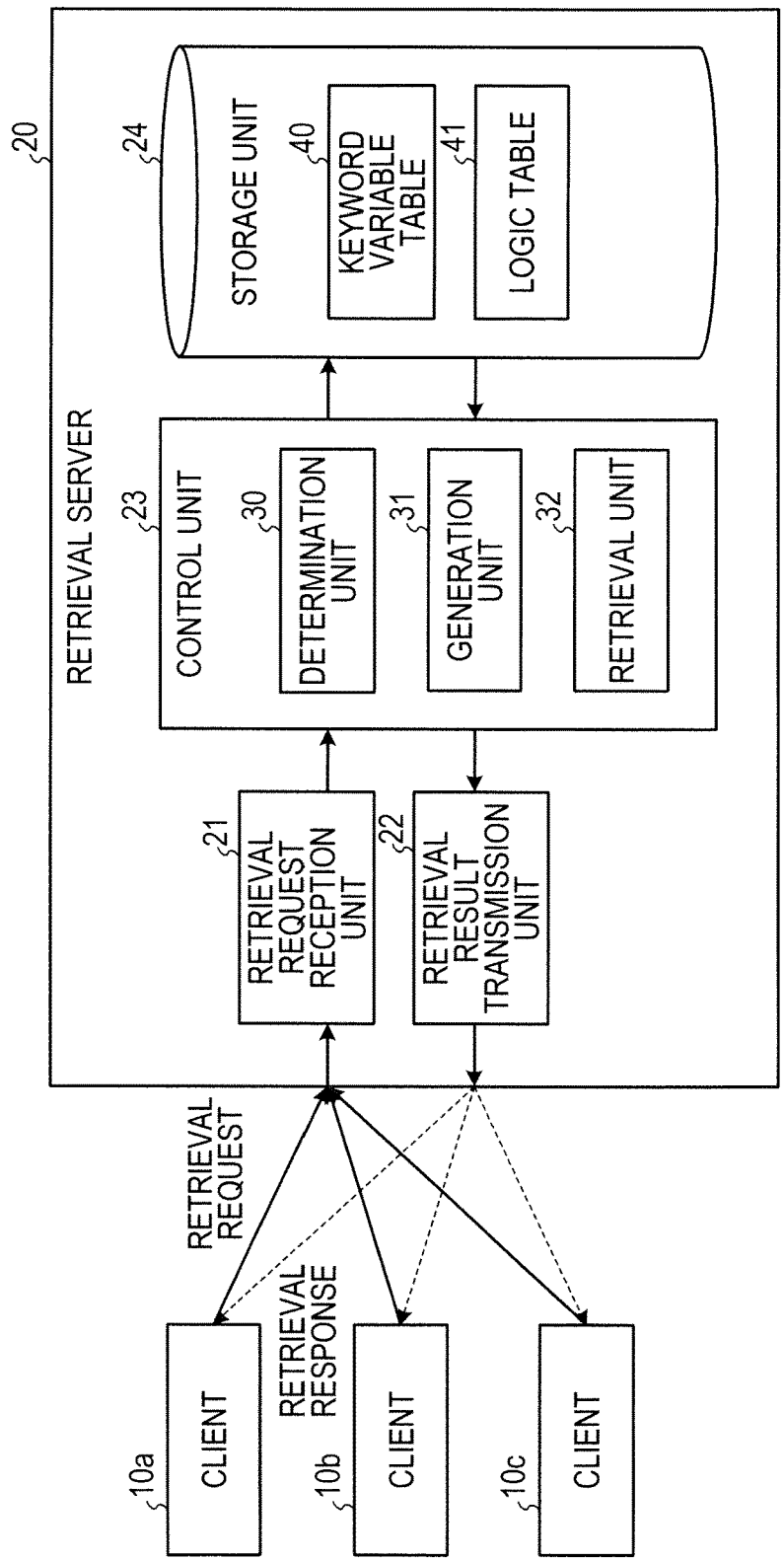
FIG. 1 is a diagram illustrating a configuration of a retrieval system according to an embodiment.

FIG. 1 illustrates an example of a functional configuration of the retrieval server 20 according to the embodiment. As illustrated in FIG. 1, the retrieval server 20 includes a retrieval request reception unit 21, a retrieval result transmission unit 22, a control unit 23, and a storage unit 24. The retrieval server 20 may have a function other than the above-mentioned functions.

The retrieval request reception unit 21 receives an input of a retrieval request. In FIG. 1, plural retrieval requests are received, respectively, from plural clients 10a to 10c through a network which is not illustrated. The input retrieval requests are temporarily stored in a buffer or the like which is not illustrated and then is sent to the control unit 23. A retrieval request includes a retrieval expression such as, for example, Expressions (1-1) to (1-3), and may include related information such as identification information of a terminal as a retrieval request source, identification information of a user who has transmitted the retrieval request, or time information at which the retrieval request is input, in addition to the retrieval expression. FIG. 1 illustrates a configuration in which the retrieval requests are input from the clients, but embodiments are not limited to this configuration. Various input devices such as a keyboard, a mouse, and a microphone may be coupled with the retrieval request reception unit 21.

The retrieval result transmission unit 22 acquires retrieval results for the retrieval requests from the control unit 23 and transmits the acquired retrieval results to the retrieval request sources. In FIG. 1, the clients having transmitted the retrieval requests are distinguished and the retrieval results are transmitted to the corresponding clients, but embodiments are not limited thereto. The retrieval results may be transmitted to a designated user or a designated device such as an administrator or a database.

The control unit 23 is a device that controls the retrieval server 20. The control unit 23 may employ an electronic circuit such as a central processing unit (CPU) or a micro processing unit (MPU), or an integrated circuit such as an application specific integrated circuit (ASIC) or a field programmable gate array (FPGA). The control unit 23 includes an internal memory for storing programs defining various procedures or control data and performs various processes using them. The control unit 23 serves as various processing units by executing various programs. For example, the control unit 23 includes a determination unit 30, a generation unit 31, and a retrieval unit 32.

The determination unit 30 performs a variety of determinations. For example, the determination unit 30 analyzes the retrieval expression included in the retrieval request input to the retrieval request reception unit 21 and determines whether information on conditional expressions and logical expressions included therein are already stored in the storage unit 24. The generation unit 31 generates logical expressions for evaluating the retrieval expression included in the input retrieval request on the basis of information registered in the storage unit 24. The retrieval unit 32 evaluates the retrieval expression included in the retrieval request on the basis of the logical expressions generated by the generation unit 31 and outputs the evaluation result to the retrieval result transmission unit 22.

The storage unit 24 is a storage device that stores therein various data. For example, the storage unit 24 is a storage device such as a hard disk, a solid-state drive (SSD), or an optical disk. The storage unit 24 may be a data-rewritable semiconductor memory such as a random access memory (RAM), a flash memory, or a nonvolatile static RAM (NVS-RAM).

The storage unit 24 stores therein an operating system (OS) program or various programs which are executed by the control unit 23. For example, the storage unit 24 stores therein various programs including a program for performing various processes to be described later. The storage unit 24 stores therein various data which is used when the control unit 23 executes the programs. For example, the storage unit 24 stores therein a keyword variable table 40 and a logic table 41.

The keyword variable table 40 is a table which holds data constituting the conditional expressions included in the retrieval request input to the retrieval server 20. The logic table 41 is a table which holds data indicating the logical expressions corresponding to the retrieval expression and the conditional expressions included in the input retrieval request. For example, in Expression (1-1), the conditional expressions A, B, C1, C2, and C3 themselves are logical expressions. Logical products of three conditional expressions (A and B and C1), (A and B and C2), and (A and B and C3) are also logical expressions. Further, the whole right side of Expression (1-1) is a logical expression. The respective logical expressions are registered in the logic table 41.

When data is registered in the keyword variable table 40 or the logic table 41, the determination unit 30 determines whether identical data is already stored in the tables. When the determination unit 30 determines that identical data is not stored yet, the data is registered in the keyword variable table 40 or the logic table 41. When the determination unit 30 determines that identical data is already stored, the data is not registered. Accordingly, the keyword variable table 40 and the logic table 41 do not include redundant data.

Figure 2:
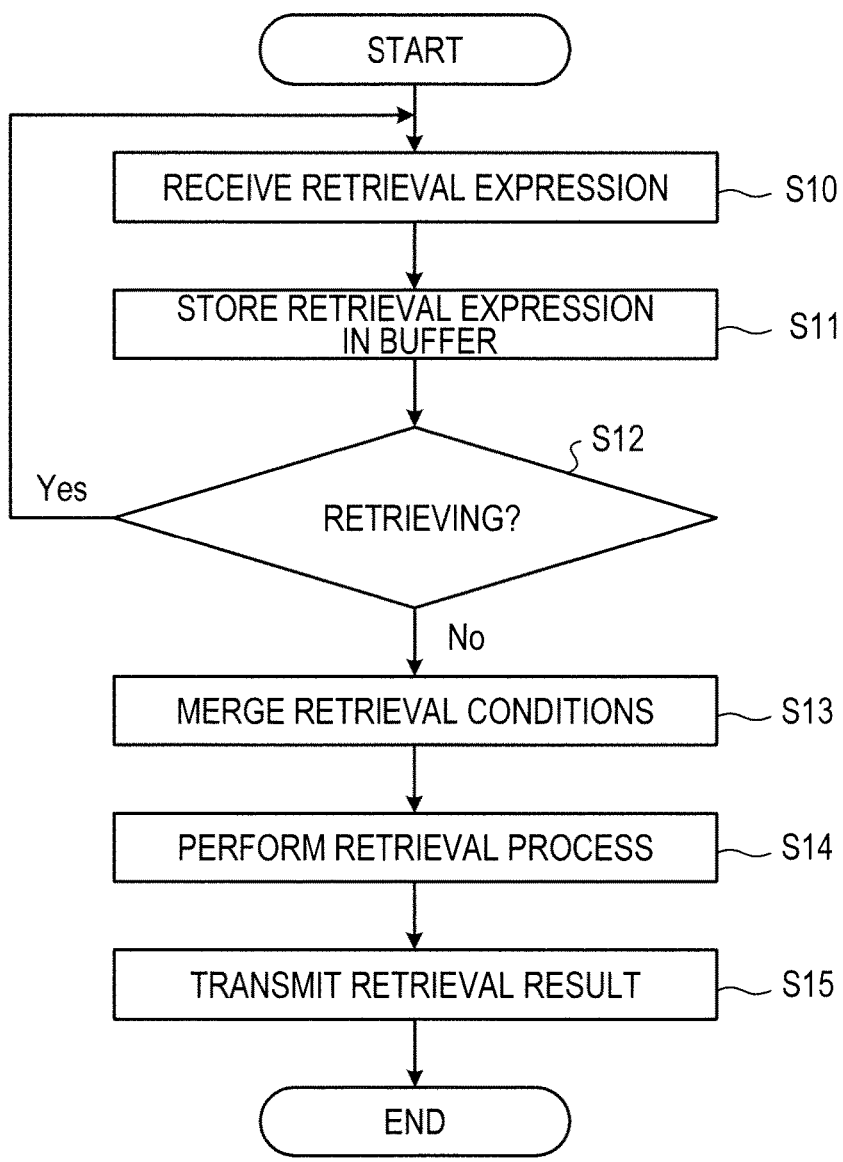
FIG. 2 is a flowchart illustrating a flow of operations performed by a retrieval server.

Operations of the retrieval server 20 according to the embodiment will be described below. FIG. 2 is a flowchart illustrating a flow of operations performed by the retrieval server 20 according to the embodiment. First, the retrieval request reception unit 21 of the retrieval server 20 receives a retrieval request including a retrieval expression from the clients 10a to 10c (S10). The retrieval expression included in the received retrieval request is stored in a buffer (S11) and the control unit 23 determines whether the retrieval unit 32 is performing a retrieval process at that time (S12).

The operation flow returns to S10 when it is determined that the retrieval process is being performed (YES in S12). The determination unit 30 performs a merger process of merging retrieval conditions for the retrieval expressions stored in the buffer (S13) when it is determined that the retrieval process is not being performed (NO in S12). After the merger process ends, the generation unit 31 generates logical expressions for evaluating the retrieval expressions stored in the buffer on the basis of information registered in the storage unit 24, and the retrieval unit 32 evaluates the retrieval expressions stored in the buffer on the basis of the generated logical expressions (S14). The retrieval result transmission unit 22 transmits the evaluation result of the retrieval expression to the clients 10a to 10c serving as the retrieval request sources (S15) and the operation flow ends. After the merger process in S13 ends, the retrieval expressions stored in the buffer is erased before a next retrieval expression is received. After the retrieval process in S14 ends, contents stored in the keyword variable table 40 and the logic table 41 are erased before a next retrieval expression is received.

Figure 3:
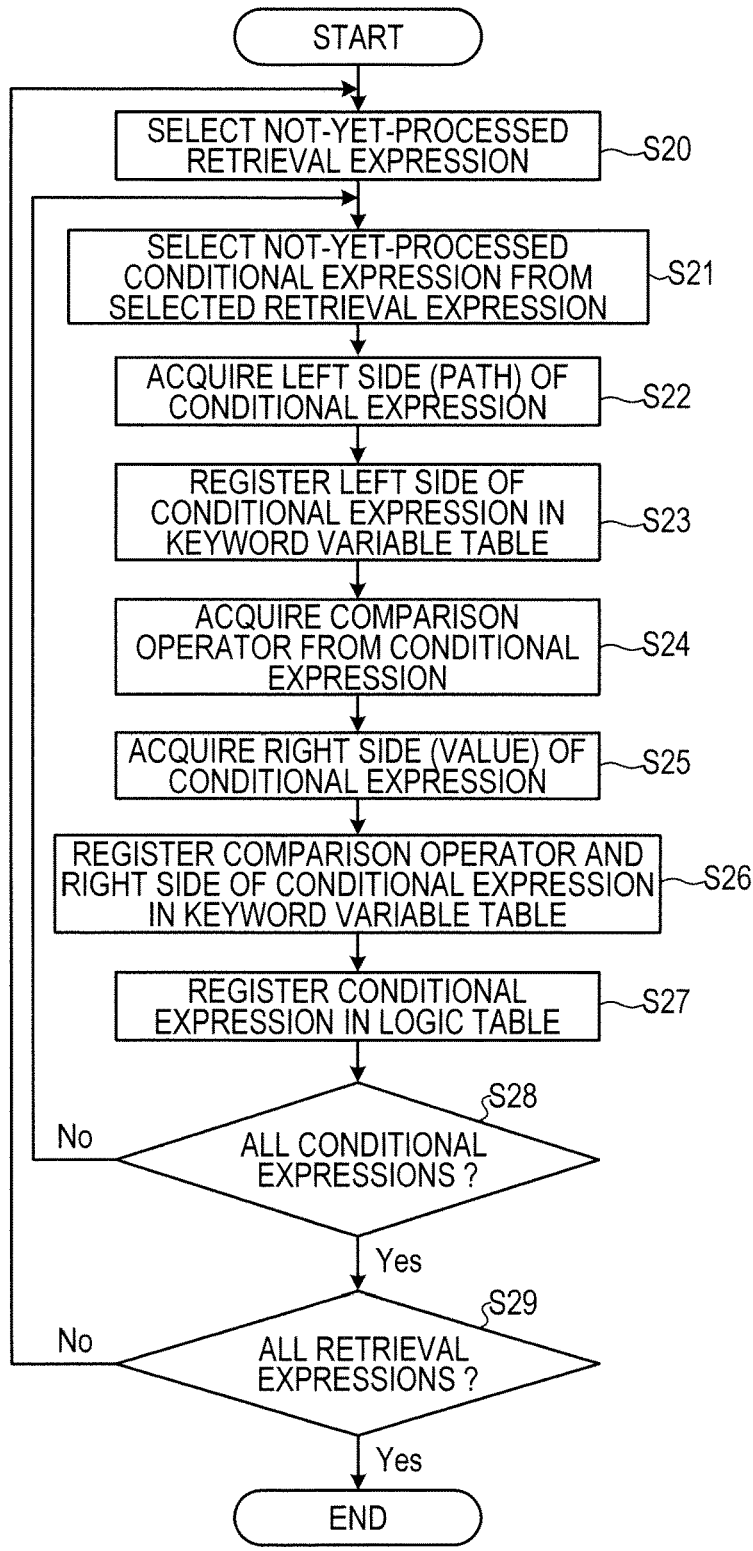
FIG. 3 is a flowchart illustrating a flow of a process of merging retrieval conditions.

FIG. 3 is a flowchart illustrating a flow of the process of merging retrieval conditions illustrated in S13 of FIG. 2 among the processes performed by the retrieval server 20 according to the embodiment. First, one retrieval expression (not-yet-processed retrieval expression) on which the merger process is not yet performed is selected from the retrieval expressions stored in the buffer (S20). Hereinafter, in the embodiment, it is assumed that data retrieval is performed on data having a structure such as an Extensible Markup Language (XML) document using an indexing technique and Expressions (2-1) and (2-2) will be described below as examples of the retrieval expression.

$$Q1: /\text{root}/A/A001=1 \text{ AND}/\text{root}/B/B001=\text{``book'' AND} \\ /\text{root}/C/C001=1 \qquad (2\text{-}1)$$

$$Q2: /\text{root}/A/A001=1 \text{ AND}/\text{root}/B/B001=\text{``book''} \\ \text{OR}/\text{root}/C/C001=3 \qquad (2\text{-}2)$$

Here, "/root/A/A001=1", "/root/B/B001="book"", and "/root/C/C001=1" in the retrieval expression Q1 of Expression (2-1) and "/root/A/A001=1", "/root/B/B001="book"", and "/root/C/C001=3" in the retrieval expression Q2 of Expression (2-2) are conditional expressions.

Referring back to FIG. 3, it is assumed that Q1 is now selected in S20. Then, the determination unit 30 selects a not-yet-processed conditional expression from the selected retrieval expression (S21). In data retrieval using the indexing technique, a conditional expression has a configuration in which the left side and the right side are coupled by a comparison operator. When it is assumed that "/root/A/A001=1" is selected in S21, "/root/A/A001" is the left side, "1" is the right side, and "=" is the comparison operator. Particularly, when the retrieval process is performed on data having a structure such as an XML document, the left side of the conditional expression is a path and the right side is a value. Data indicated by the path at the left side is first referred, the value at the right side is referred, and then it is evaluated whether the reference result about the left side and the right side satisfies a relationship indicated by the comparison operator.

The determination unit 30 performs syntax analysis or the like on the conditional expression selected in S21 and acquires the left side (path) (S22). The determination unit 30 determines whether the acquired left side (path) is already stored in the keyword variable table 40, and registers the left side (path) in association with identification information in the keyword variable table 40 when it is determined that the acquired left side is not stored yet (S23). The identification information is information which is uniquely given to every data registered in the keyword variable table 40.

Subsequently, the determination unit 30 acquires the comparison operator from the conditional expression (S24) and acquires the right side (value) (S25). The determination unit 30 determines whether the acquired right side (value) associated with a path identical to the acquired path and a comparison operator identical to the acquired comparison operator is already stored in the keyword variable table 40, and generates a new entry in which the right side (value) is associated with identification information and registers the generated new entry in the keyword variable table 40 when it is determined that the acquired right side is not stored yet (S26).

The determination unit 30 determines whether a logical expression identical to the selected conditional expression is already stored in the logic table 41 on the basis of the identification information corresponding to the left side and the right side of the conditional expression, and generates a new entry in which the conditional expression is associated with a corresponding combination of identification information and registers the generated new entry in the logic table 41 when it is determined that the logical expression is not stored yet, and the processing of the conditional expression ends (S27).

Then, it is determined whether all the conditional expressions included in the selected retrieval expression have been processed (S28). When it is determined that some of the conditional expressions have not been processed (NO in S28), a new conditional expression is selected from the selected retrieval expression again in S21. When it is determined that all the conditional expressions have been processed (YES in S28), it is determined in S29 whether all the retrieval expressions stored in the buffer have been processed. When it is determined that some of the retrieval expressions have not been processed (NO in S29), a new retrieval expressions is selected from the retrieval expressions stored in the buffer in S20 again. When it is determined that all the retrieval expressions have been processed (YES in S29), the operation flow ends.

Keywords registered in the keyword variable table 40 through the process of merging retrieval conditions are classified into a set of paths and a set of values. In the retrieval, analysis of the path to be referred is performed first. When the path is successfully referred, the value is referred and evaluation of the logical expression is performed.

Figure 4:
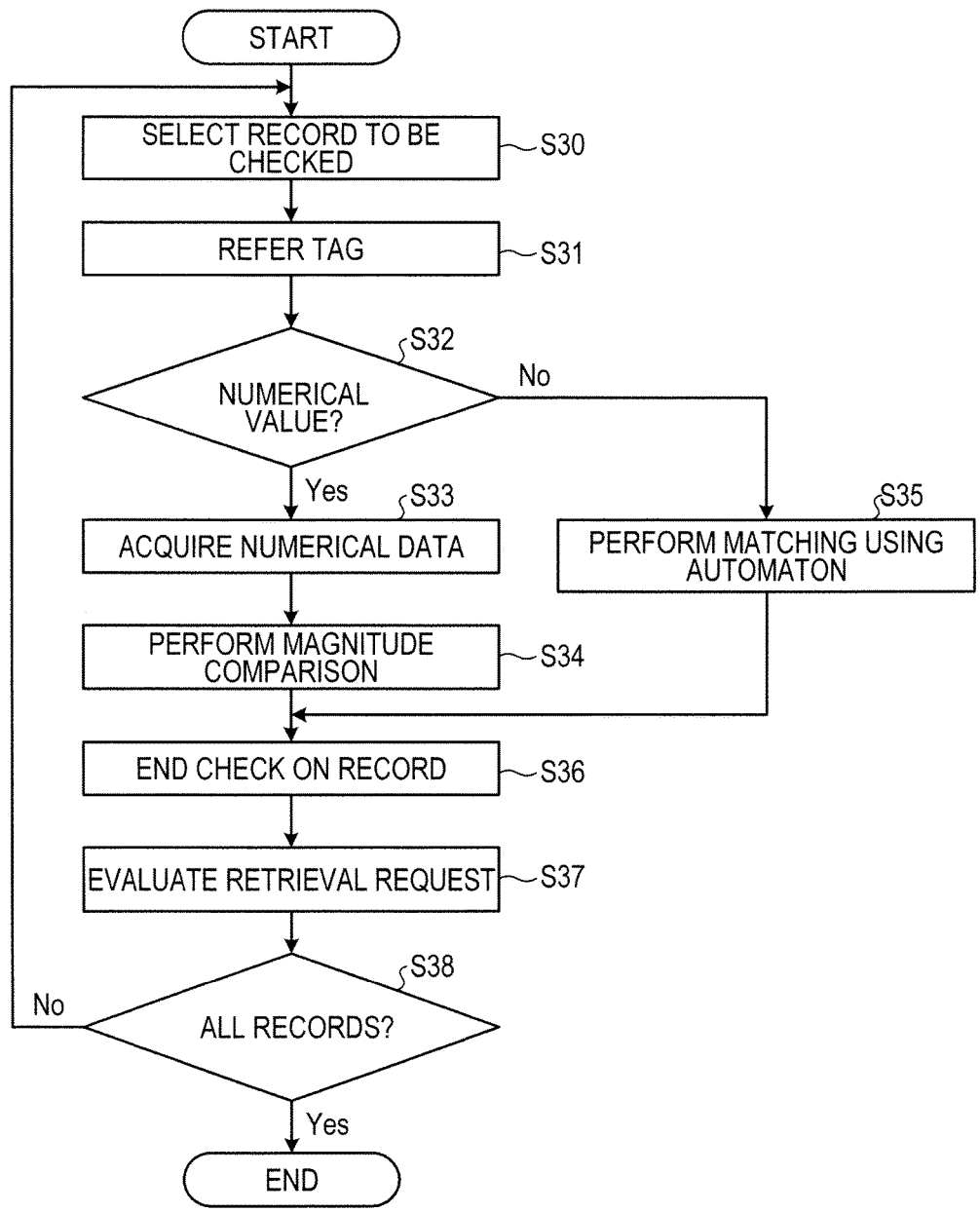
FIG. 4 is a flowchart illustrating a flow of a retrieval process.

FIG. 4 is a flowchart illustrating a flow of the retrieval process illustrated in S14 of FIG. 2 among the processes performed by the retrieval server 20 according to the embodiment. First, the control unit 23 selects a record to be checked (S30). In the embodiment, it is assumed that data retrieval is performed on data having a structure, but where the data is stored is not particularly mentioned. The data on which data retrieval is to be performed may be stored in the storage unit 24 illustrated in FIG. 1 or may be stored in an external storage device coupled with the retrieval server 20 through a network, but the storage of data is not limited thereto.

Referring back to FIG. 4, after the record to be checked is selected in S30, the generation unit 31 generates a logical expression (hereinafter, referred to as an A-type logical expression) corresponding to the conditional expression on the basis of the keyword variable table 40. The retrieval unit 32 performs data reference regarding the record on the basis of the generated A-type logical expression, and traces the path to perform tag reference (S31). The retrieval unit 32 determines whether the value at the right side of the A-type logical expression to be evaluated is a numerical value (S32). When the value is a numerical value (YES in S32), numerical data is acquired (S33), evaluation is performed by magnitude comparison in accordance with the comparison operator of the conditional expression (S34), and then check on the selected record ends (S36).

When the value at the right side of the A-type logical expression to be evaluated is not a numerical value (NO in S32), the value is a character string and is matched using an automaton (S35), and then check on the selected record ends (S36). The automaton may be constructed on the basis of a character string matching algorithm such as an Aho-Corasick (AC) algorithm or a Boyer-Moore string search (BM) algorithm.

After the check on the selected record ends in S36, the generation unit 31 generates a logical expression (hereinafter, referred to as a Z-type logical expression) corresponding to the retrieval expression on the basis of the logic table 41. The retrieval unit 32 evaluates the retrieval request by evaluating the generated Z-type logical expression corresponding to the retrieval expression on the basis of results of evaluating the selected record using the generated A-type logical expressions (S37). Then, it is determined whether all the records have been checked (S38), and a not-yet-checked record is selected in S30 when it is determined that some of the records are not checked yet (NO in S38). When it is determined that all the records have been checked (YES in S38), the retrieval process ends.

FIGS. 5A to 5K are diagrams illustrating the process of merging retrieval conditions illustrated in FIG. 3 among the processes performed by the retrieval server 20 according to the embodiment. It is assumed that Q1 and Q2 expressed by Expressions (2-1) and (2-2) are registered in the keyword variable table 40 and the logic table 41. In each table, information which is referred to or newly added in the process is hatched.

In FIG. 5A, first, the retrieval expression Q1 is selected (S20), the leftmost conditional expression "/root/A/A001=1" is selected from Q1 (S21), and the path "/root/A/A001" of the selected conditional expression is acquired (S22). Since the keyword variable table 40 is empty at the first time, it is determined that the acquired path is not yet registered in the keyword variable table 40, and a new entry for the path "/root/A/A001" is registered in the keyword variable table 40 in association with a logic number A1 (S23). The logic number in FIG. 5A is identification information which is uniquely given to each entry registered in the keyword variable table 40. Hereinafter, the path and the value registered in the keyword variable table 40 are generically referred to as a "keyword".

In FIG. 5B, the comparison operator "=" is acquired from the conditional expression "/root/A/A001=1" (S24) and the value "1" is acquired (S25). It is determined that an entry having a combination of the acquired value "1" and the acquired comparison operator "=" associated with a path of A1 is not yet registered in the keyword variable table 40, and a new entry for the combination and the logic number A1 of the path is registered in the keyword variable table 40 in association with a logic number A2 (S26).

In FIG. 5C, it is determined whether a set of logic numbers (A1. A2) corresponding to the right side and the left side of the conditional expression "/root/A/A001=1" is already registered in the logic table 41, and the set of logic numbers (A1. A2) is registered in the logic table 41 in association with a logical expression number Z1 when it is determined that the set of logic numbers is not yet registered (S27). The logical expression number in FIG. 5C is identification information which is uniquely given to each entry registered in the logic table 41.

Since some of the conditional expressions of Q1 are not yet processed (NO in S28), "/root/B/B001="book"" is selected in S21. In a similar manner to "/root/A/A001=1", an entry for the path "/root/B/B001" is registered in the keyword variable table 40 in association with a logic number A3 (S23). An entry for the value ""book"" along with the comparison operator "=" and the logic number A3 of the path is registered in the keyword variable table 40 in association with a logic number A4 (S26), and an entry for a set of logic numbers (A3. (A4)) is registered in the logic table 41 in association with a logical expression number Z2 (S27). Here, the parenthesis attached to A4 in the set of A3 and A4 registered in association with the logical expression number Z2 in the logic table represents that the keyword of A4 includes a quotation mark.

Figure 5D:
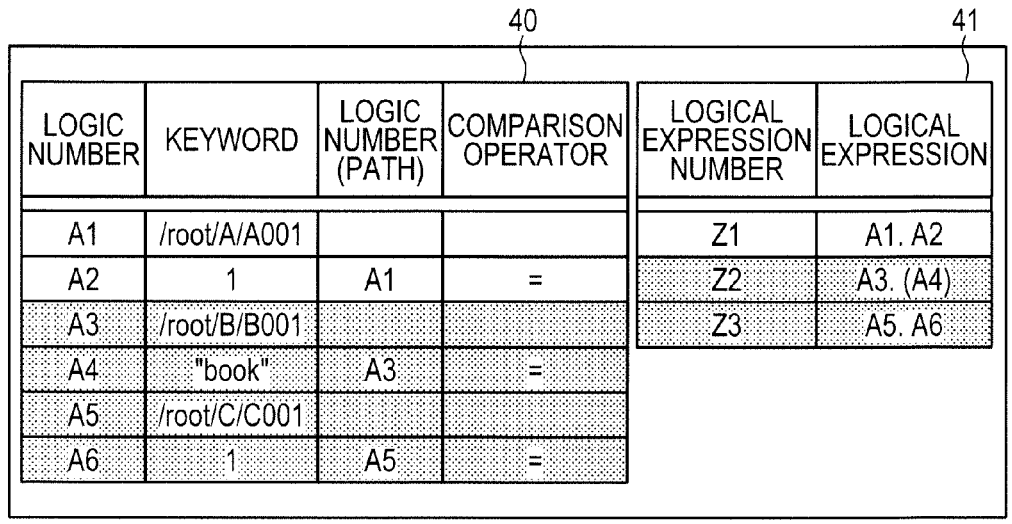
FIG. 5D is a diagram illustrating an example of registration in a keyword variable table and a logic table according to an embodiment.

Since some of the conditional expressions of Q1 are not yet processed (NO in S28), "/root/C/C001=1" is selected in S21. In a similar manner to "/root/A/A001=1", an entry for the path "/root/C/C001" is registered in the keyword variable table 40 in association with a logic number A5 (S23). An entry for the value "1" along with the comparison operator "=" and the logic number A5 of the path is registered in the keyword variable table 40 in association with a logic number A6 (S26), and an entry for a set of logic numbers (A5. A6) is registered in the logic table 41 in association with a logical expression number Z3 (S27). After the above-mentioned processes, the details registered in the keyword variable table 40 and the logic table 41 are as illustrated in FIG. 5D.

Figure 5E:
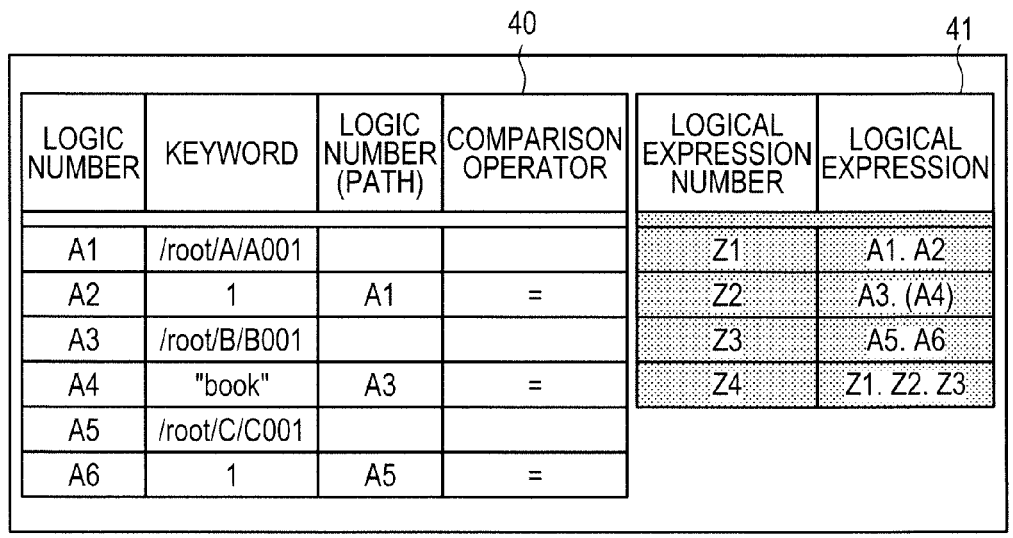
FIG. 5E is a diagram illustrating an example of registration in a keyword variable table and a logic table according to an embodiment.

As a result, all the conditional expressions of Q1 are processed (YES in S28) and the whole Q1 is registered as a logical expression. The logical expression of Q1 is expressed by a logical product of the logical expression numbers Z1, Z2, and Z3 associated with the conditional expressions. Since it is determined that an entry for these logical expressions is not yet registered in the logic table 41, a new entry for the set of logical expression numbers (Z1, Z2, Z3) is registered in association with a logical expression number Z4 as illustrated in FIG. 5E. Here, periods between the logical expressions Z1, Z2, and Z3 in the logic table 41 denote a logical operator AND.

Figure 5F:
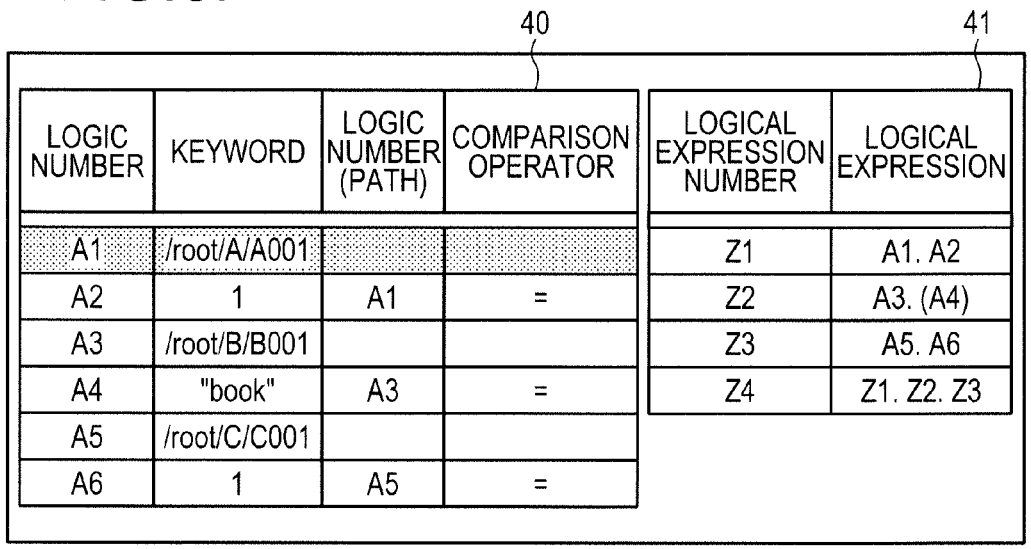
FIG. 5F is a diagram illustrating an example of registration in a keyword variable table and a logic table according to an embodiment.

Then, Q2 is selected as a not-yet-processed retrieval expression in S20, the leftmost conditional expression "/root/A/A001=1" is selected from Q2 (S21), and a path "/root/A/A001" of the selected conditional expression is acquired (S22). In FIG. 5F, it is determined that the acquired path is already registered in the keyword variable table 40, and thus a new entry for the path is not registered in the keyword variable table 40.

Figure 5G:
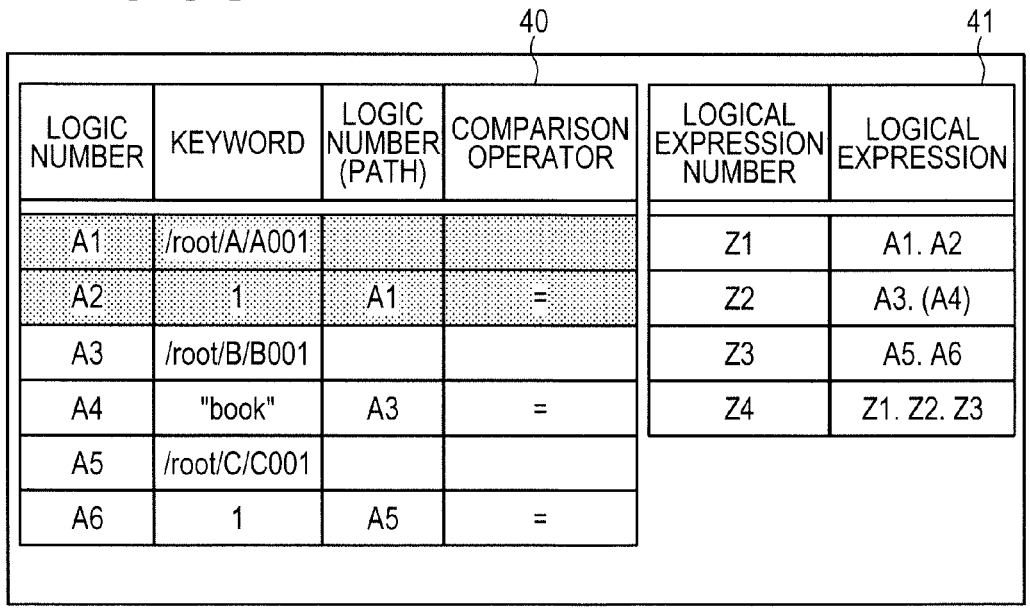
FIG. 5G is a diagram illustrating an example of registration in a keyword variable table and a logic table according to an embodiment.

A comparison operator "=" is acquired from the conditional expression "/root/A/A001=1" of Q2 (S24) and a value "1" is acquired (S25). In FIG. 5G, since it is determined that an entry having a combination of the acquired value "1" and the acquired comparison operator "=" with a path of A1 is already registered in the keyword variable table 40, a new entry for the combination is not registered in the keyword variable table 40.

Figure 5H:
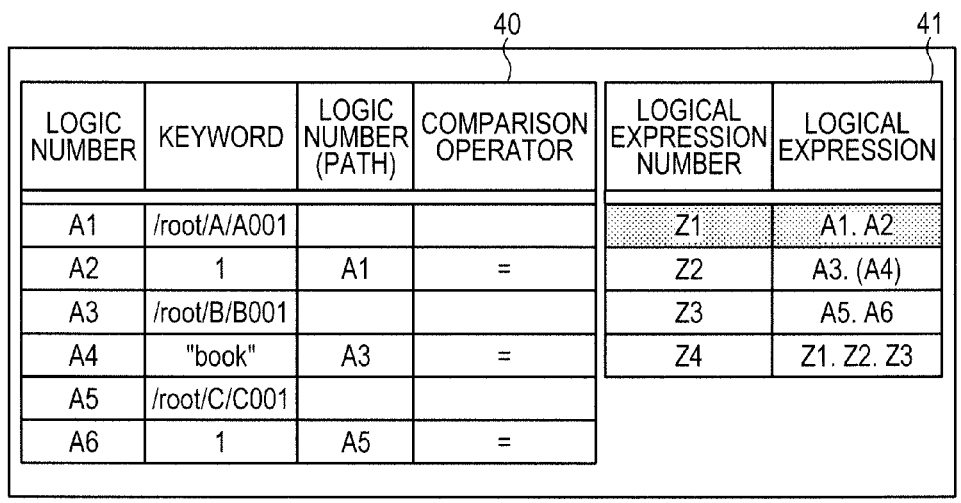
FIG. 5H is a diagram illustrating an example of registration in a keyword variable table and a logic table according to an embodiment.

In FIG. 5H, since it is determined that an entry for a set of logic numbers (A1. A2) corresponding to the right side and the left side of the conditional expression "/root/A/A001=1" of Q2 is already registered in the logic table 41, a new entry for the set is not registered in the logic table 41.

Figure 5I:
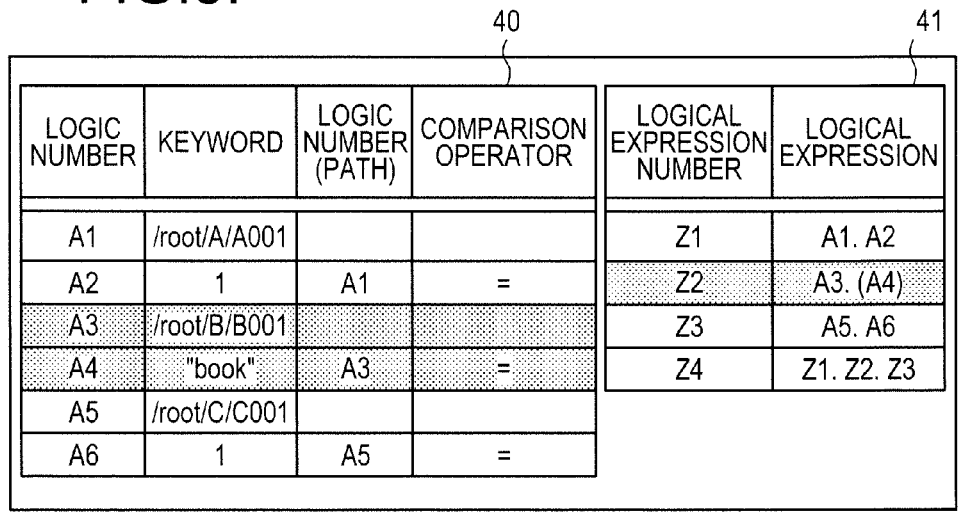
FIG. 5I is a diagram illustrating an example of registration in a keyword variable table and a logic table according to an embodiment.

Similarly, a path and a value of a conditional expression "/root/B/B001="book"" of Q2 are acquired. In FIG. 5I, since it is determined that entries for this conditional expression are registered in the keyword variable table 40 and the logic table 41, new entries are not registered.

In FIG. 5J, a path and a value of a conditional expression "/root/C/C001=3" of Q2 are acquired. Since it is determined that the path "/root/C/C001" is already registered in the keyword variable table 40, the path is not registered. However, since it is determined that an entry having a combination of the acquired value "3" and the acquired comparison operator "=" with a path of A5 is not yet registered in the keyword variable table 40, a new entry for the combination and the path of A5 is registered in the keyword variable table 40 in association with a logic number A7 (S26).

In FIG. 5K, since it is determined that a set of logic numbers (A5. A7) corresponding to the right side and the left side of the conditional expression "/root/C/C001=3" of Q2 is not yet registered in the logic table 41, an entry for the set of logic numbers (A5. A7) is registered in the logic table 41 in association with a logical expression number Z5 (S27).

All the conditional expressions of Q2 are processed (YES in S28) and the whole Q2 is registered as a logical expression. The logical expression of Q2 is expressed by a logical expression using the logical expression numbers Z1, Z2, and Z5 associated with the conditional expressions. Since it is determined that an entry for these logical expressions is not yet registered in the logic table 41, a new entry for the set of logical expression numbers (Z1, Z2, Z5) is registered in association with a logical expression number Z6 as illustrated in FIG. 5L. All processes for the retrieval expressions Q1 and Q2 are ended in this way (YES in S29). In Z5, a comma between the logical expressions Z2 and Z5 in the logic table 41 denotes a logical operator OR.

FIG. 6 is an example of registration in a keyword variable table 50 and a logic table 51 according to a related art. Specifically, FIG. 6 illustrates the keyword variable table 50 and the logic table 51 in which entries for Q1 and Q2 are registered by the retrieval system using the ride-sharing retrieval method of above-described related art. In the ride-sharing retrieval method, since identical paths are merged, the paths A1, A3, and A5 are registered as the keywords without redundancy. However, A2 and A7, and A4 and A8 are redundantly registered with the identical value, the identical comparison operator, and the identical path. When A2 and A7 are identical to each other, Z1 and Z5 are also identical to each other. When A4 and A8 are identical to each other, Z2 and Z6 are also identical to each other. Accordingly, there are redundant registrations in the keyword variable table 50 and the logic table 51.

That is, in the keyword variable table 50 in FIG. 6, since redundancy in the set of paths is suppressed, the path analysis process of performing reference about the paths is reduced in the retrieval. However, since the set of values includes redundancy, reference about the values and evaluation of the logical expressions are redundantly performed.

Nine keywords associated with logic numbers A1 to A9 are registered in the keyword variable table 50 according to the related art illustrated in FIG. 6, while the number of keywords registered in the keyword variable table 40 illustrated in FIG. 5K is reduced to seven as indicated by logic numbers A1 to A7. Eight logical expressions associated with logical expression numbers Z1 to Z8 are registered as in the logic table 51 according to the related art illustrated in FIG. 6, while the number of logical expressions registered in the logic table 41 illustrated in FIG. 5L is reduced to six as indicated by logical expression numbers Z1 to Z6. Accordingly, since the set of values includes no redundancy, it is possible to efficiently perform reference about the values and evaluation of the logical expressions.

In the ride-sharing retrieval method according to the related art, element names in a path, which is the left side of the conditional expression, are managed by identifiers (IDs) and the path is expressed in a hierarchical structure of IDs. For example, the path "/root/A/A001=1" of the logic number A1 is expressed "1-2-3" in which 1 indicates "root", 2 indicates "A", and 3 indicates "A001", and the hierarchical structures of paths are compared for matching.

On the other hand, in the embodiment, values which are the right sides of the conditional expressions may be easily compared by coupling elements as follows and then performing hashing using the coupled elements as keys. For example, in case of A2, the hashing is performed using a combination of the value "1", the path "A1", and the comparison operator "=" as a key. By comparing hash-converted results, the values are registered without redundancy, and reference about the values and evaluation of the logical expressions are efficiently performed.

Figure 7:
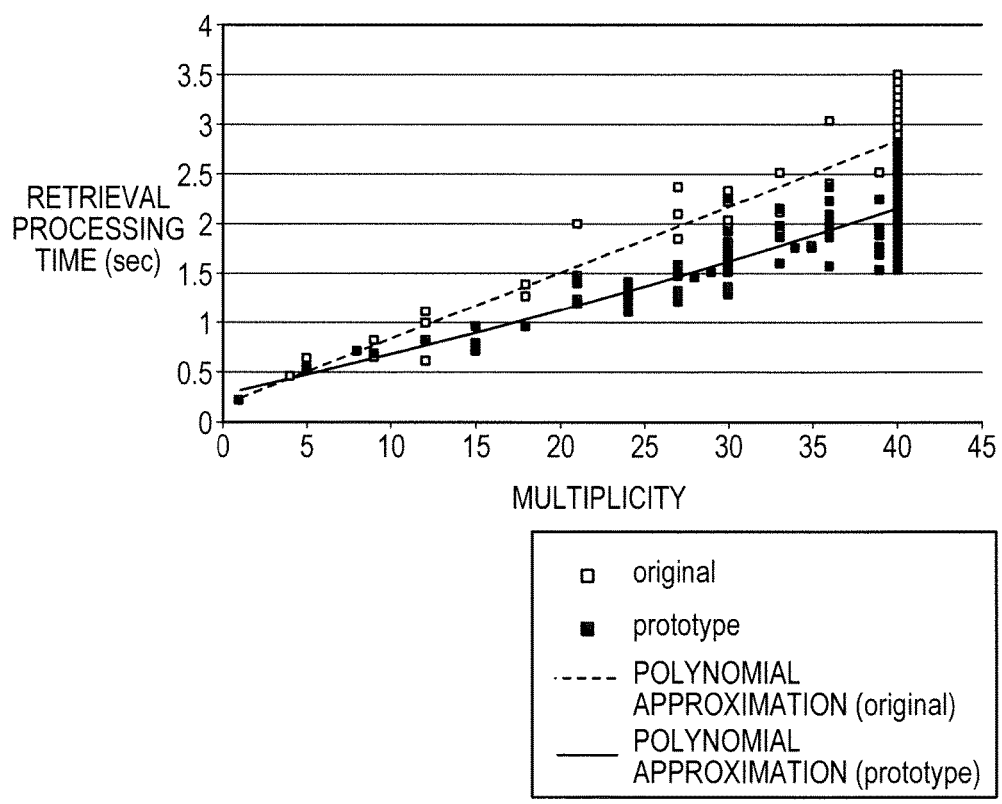
FIG. 7 is a graph illustrating multiplex retrieval processing times in retrievals according to an embodiment and a related art.

FIG. 7 illustrates measurement results of the processing time when plural retrieval expressions having various multiplicities are automatically generated and the plural retrieval expressions are processed in a batch manner using the retrieval method according to the related art and the method according to the embodiment. In the example illustrated in FIG. 7, the retrieval processing time is marked in the vertical axis and the multiplicities of the plural retrieval expressions are marked in the horizontal axis. The multiplicity is an average of the numbers of times that all keywords included in the retrieval expressions appear in the retrieval expressions.

In the example illustrated in FIG. 7, a plot of white squares (original) denotes the retrieval method according to the related art and a plot of black squares (prototype) denotes the retrieval method according to the embodiment. A polynomial-approximated line is additionally drawn for each of the plots of the retrieval methods. It may be seen from FIG. 7 that the processing speed of the retrieval method according to the embodiment is 1.3 times that of the retrieval method according to the related art in view of simulation.

As described above, unlike the keyword variable table in the related art, the retrieval server 20 according to the embodiment performs matching on the value at the right side of a conditional expression on the basis of the relationship between the path at the left side and the comparison operator between both sides in the course of analyzing retrieval expressions. Accordingly, when a single retrieval expression includes plural identical conditional expressions, it is possible to reduce a size of the keyword variable table, which is prepared on the basis of the retrieval expression, by not performing redundant registration in the keyword variable table. By reducing the size of the keyword variable table, it is possible to reduce an evaluation cost of the table and to shorten a retrieval application response time.

Unlike the keyword variable table in the related art, the retrieval server 20 according to the embodiment performs matching on the value at the right side of a conditional expression on the basis of the relationship between the path at the left side and the comparison operator between both sides in the course of analyzing retrieval expressions. Accordingly, even when plural retrieval expressions, which are simultaneously processed, include plural identical conditional expressions, it is possible to reduce a size of the keyword variable table, which is prepared on the basis of the retrieval expression, by not performing redundant registration in the keyword variable table. By reducing the size of the keyword variable table, it is possible to reduce an evaluation cost of the table and to shorten a retrieval application response time.

The retrieval server 20 according to the embodiment performs matching on the value at the right side of a conditional expression on the basis of the relationship between the path at the left side and the comparison operator between both sides and performs matching on the path at the left side of the conditional expression in the course of analyzing retrieval expressions. Accordingly, when plural retrieval expressions include plural identical conditional expressions, it is possible to reduce a size of the keyword variable table, which is prepared on the basis of the retrieval expression, by not performing redundant registration in the keyword variable table. By reducing the size of the keyword variable table, it is possible to reduce an evaluation cost of the table and to shorten a retrieval application response time.

The retrieval server 20 according to the embodiment may perform matching on the value at the right side of a conditional expression on the basis of the relationship between the path at the left side and the comparison operator between both sides and then register the value in association with identification information, and may perform matching on the path at the left side of the conditional expression and then register the path in association with identification information, in the course of analyzing retrieval expressions. Since the registration in the logic table may be performed on the basis of a combination of identification information of the left side and the right side of the conditional expression, redundant registration of identical combinations of identification information is not performed. Accordingly, when a retrieval expression includes plural identical conditional expressions, it is possible to reduce the size of the logic table which is prepared on the basis of the retrieval expression. By reducing the size of the logic table, it is possible to reduce an evaluation cost of the table and to shorten a retrieval application response time.

The higher the multiplicity level of a retrieval expression becomes, the higher the probability of occurrence of redundancy of the conditional expressions becomes. Accordingly, in the retrieval server 20 according to the embodiment, it is possible to further shorten the retrieval application response time and to more efficiently perform retrieval.

While the embodiment has been described above, the disclosed technique may be modified in various forms as well as the above-mentioned embodiment.

The elements of the illustrated devices are functional and conceptual and do not have to be necessarily physically configured as illustrated in the drawings. That is, specific distributed or combined states of the devices are not limited to those illustrated in the drawings, but all or a part thereof may be distributed or merged functionally or physically in arbitrary units depending on various loads or use conditions. For example, the processing units of the retrieval request reception unit 21, the retrieval result transmission unit 22, the control unit 23, and the storage unit 24 may be appropriately combined. The processes of the processing units may be appropriately divided into processes of plural processing units. All or a part of the processing functions which are performed by the processing units may be realized by a CPU and a program which is executed by the CPU or may be realized by hardware based on wired logics.

Figure 8:
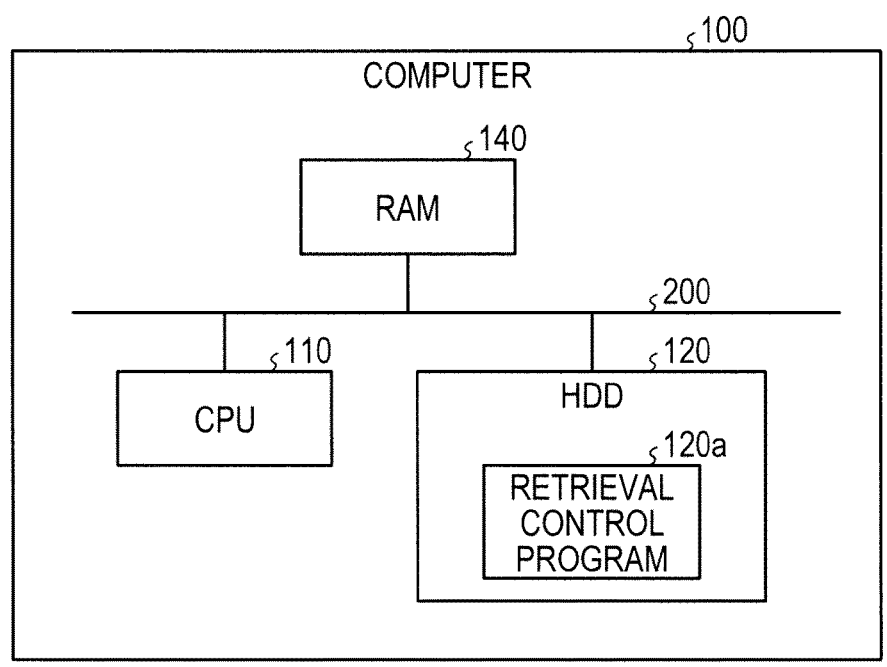
FIG. 8 is a diagram illustrating an example of a configuration of a computer that executes a retrieval control program.

Various processes described in the above-mentioned embodiment may be realized by causing a computer system such as a personal computer or a workstation to execute a predetermined program. Therefore, an example of a computer system that executes a program having similar functions as in the above-mentioned embodiment will be described below. FIG. 8 is a diagram illustrating an example of a configuration of a computer that executes a retrieval control program.

As illustrated in FIG. 8, a computer 100 includes a central processing unit (CPU) 110, a hard disk drive (HDD) 120, and a random access memory (RAM) 140. The units 110 to 140 are coupled with each other via a bus 200.

A retrieval control program 120a for performing similar functions to those of the retrieval request reception unit 21, the retrieval result transmission unit 22, the control unit 23, and the storage unit 24 is stored in the HDD 120 in advance. The retrieval control program 120a may be appropriately divided.

The HDD 120 also stores therein a variety of information. For example, the HDD 120 stores the keyword variable table 40 and the logic table 41 as data which is used for retrieval.

The CPU 110 performs similar operations to those of the processing units according to the embodiment by reading the retrieval control program 120a from the HDD 120 and executing the read program. That is, the CPU 110 performs similar operations to those of the retrieval request reception unit 21, the retrieval result transmission unit 22, the control unit 23, and the storage unit 24 by executing the retrieval control program 120a.

The above-mentioned retrieval control program 120a is not necessarily required to be stored in the HDD 120 from the first.

For example, the program may be stored in a "portable physical medium" such as a flexible disk (FD), a compact disc read-only memory (CD-ROM), a digital versatile disc (DVD), a magneto-optical disk, or an integrated circuit (IC) card which is inserted into the computer 100. Then, the computer 100 may read the program therefrom and execute the read program.

In addition, the program may be stored in "another computer (or server)" coupled with the computer 100 via a public line, the Internet, a local area network (LAN), a wide area network (WAN), or the like. Then, the computer 100 may read the program therefrom and execute the read program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process, the process comprising:

determining whether to generate a first entry, on basis of whether a second entry is already stored in a storage device, for each conditional expression included in a plurality of retrieval expressions, the first entry including a first path in association with newly assigned first identification information, the first path being included in the conditional expression, the second entry including a second path in association with second identification information different from the first identification information, the second path being identical to the first path;

generating and storing the first entry in the storage device when the second entry is not stored in the storage device;

determining whether to generate a third entry on basis of whether a fourth entry is already stored in the storage device, the third entry including a first set and fifth identification information in association with newly assigned third identification information, the first set being included in the conditional expression and including a first value and a first operator, the fifth identification information being the first identification information or the second identification information, the fourth entry including a second set and the fifth identification information in association with fourth identification information different from the third identification information, the second set being identical to the first set;

generating and storing the third entry in the storage device when the fourth entry is not stored in the storage device, based on a combination of identification information of a left side and a right side of the conditional expression, thereby preventing a redundant registration of the third entry due to a combination of identical identification information; and generating a first logical expression using identification information included in entries stored in the storage device, the first logical expression being used to evaluate the conditional expression.

2. The non-transitory computer-readable recording medium according to claim 1, the process comprising:

determining not to generate the first entry when the second entry is already stored in the storage device; and determining not to generate the third entry when the fourth entry is already stored in the storage device.

3. The non-transitory computer-readable recording medium according to claim 1, the process comprising:

determining whether a fifth entry is already stored in the storage device, the fifth entry including a third set in association with identification information of the first logical expression, the third set including the fifth identification information and sixth identification information, the sixth identification information being the third identification information or the fourth identification information;

generating and storing a sixth entry in the storage device upon determining that the fifth entry is not yet stored in the storage device, the sixth entry including the third set in association with newly assigned identification information; and generating, for each retrieval expression of the plurality of retrieval expressions, a second logical expression using identification information of logical expressions included in entries stored in the storage device, the second logical expression being used to evaluate the retrieval expression.

4. A retrieval control method, comprising:

determining, by a computer, whether to generate a first entry, on basis of whether a second entry is already stored in a storage device, for each conditional expression included in a plurality of retrieval expressions, the first entry including a first path in association with newly assigned first identification information, the first path being included in the conditional expression, the second entry including a second path in association with second identification information different from the first identification information, the second path being identical to the first path;

generating and storing the first entry in the storage device when the second entry is not stored in the storage device;

determining whether to generate a third entry on basis of whether a fourth entry is already stored in the storage device, the third entry including a first set and fifth identification information in association with newly assigned third identification information, the first set being included in the conditional expression and including a first value and a first operator, the fifth identification information being the first identification information or the second identification information, the fourth entry including a second set and the fifth identification information in association with fourth identification information different from the third identification information, the second set being identical to the first set;

generating and storing the third entry in the storage device when the fourth entry is not stored in the storage device, based on a combination of identification information of a left side and a right side of the conditional expression, thereby preventing a redundant registration of the third entry due to a combination of identical identification information; and generating a first logical expression using identification information included in entries stored in the storage device, the first logical expression being used to evaluate the conditional expression.

5. A retrieval server, comprising:

a storage device; and a processor coupled to the storage device, wherein the processor is configured to:

determine whether to generate a first entry, on basis of whether a second entry is already stored in the storage device, for each conditional expression included in a plurality of retrieval expressions, the first entry including a first path in association with newly assigned first identification information, the first path being included in the conditional expression, the second entry including a second path in association with second identification information different from the first identification information, the second path being identical to the first path, generate and store the first entry in the storage device when the second entry is not stored in the storage device, determine whether to generate a third entry on basis of whether a fourth entry is already stored in the storage device, the third entry including a first set and fifth identification information in association with newly assigned third identification information, the first set being included in the conditional expression and including a first value and a first operator, the fifth identification information being the first identification information or the second identification information, the fourth entry including a second set and the fifth identification information in association with fourth identification information different from the third identification information, the second set being identical to the first set, generate and store the third entry in the storage device when the fourth entry is not stored in the storage device, based on a combination of identification information of a left side and a right side of the conditional expression, thereby preventing a redundant registration of the third entry due to a combination of identical identification information, and generate a first logical expression using identification information included in entries stored in the storage device, the first logical expression being used to evaluate the conditional expression.

\* \* \* \* \*